Dec. 29, 1931.  G. W. SMITH, JR  1,838,160
METHOD OF BRAZING A PART OF NONFERROUS METAL IN A PART OF FERROUS METAL
Filed June 12, 1931  2 Sheets-Sheet 1

INVENTOR
George W. Smith, Jr.
BY
RM Cooper
ATTORNEY

Dec. 29, 1931. G. W. SMITH, JR 1,838,160
METHOD OF BRAZING A PART OF NONFERROUS METAL IN A PART OF FERROUS METAL
Filed June 12, 1931  2 Sheets-Sheet 2
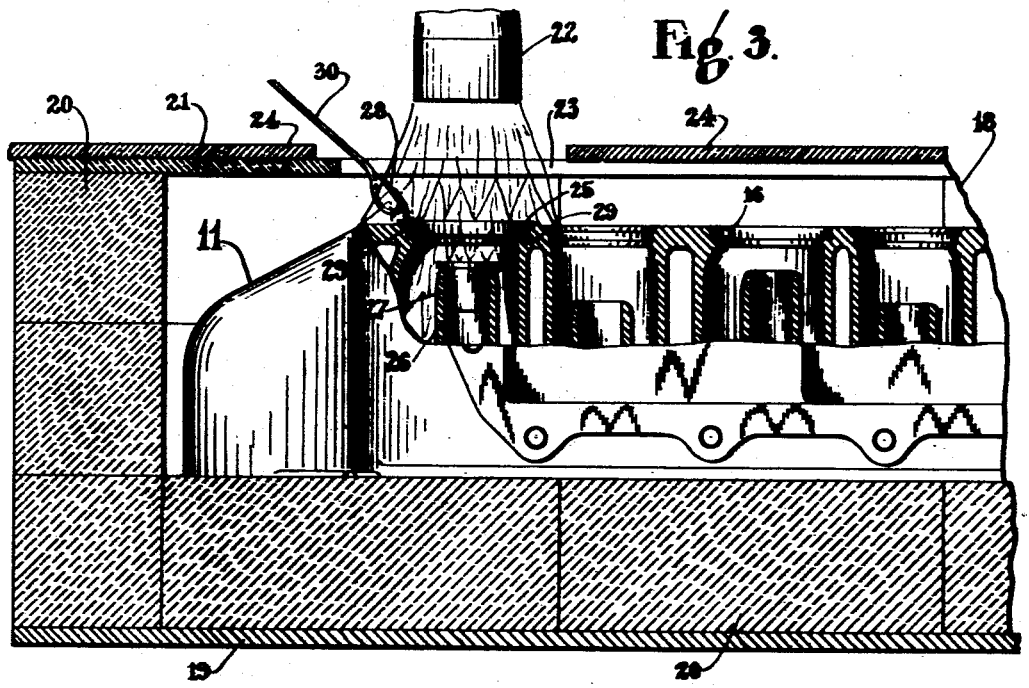
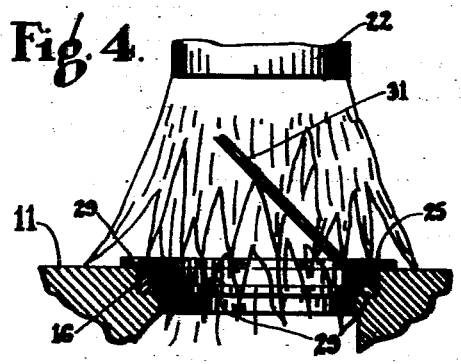
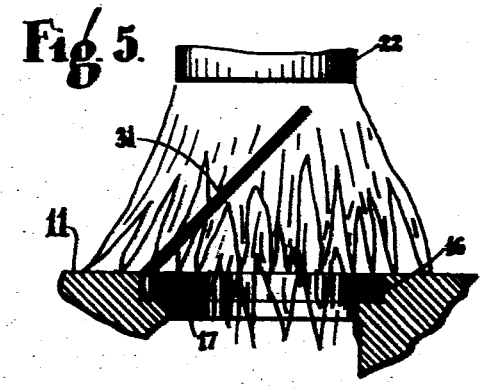
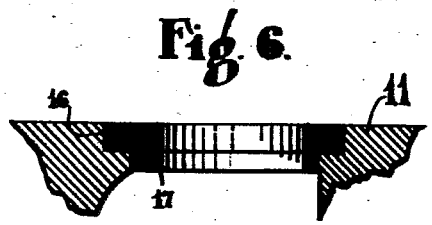
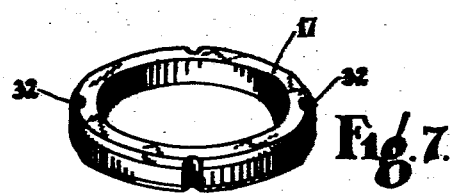
INVENTOR
George W. Smith, Jr.
BY
M Cooper
ATTORNEY Patented Dec. 29, 1931

1,838,160

UNITED STATES PATENT OFFICE

GEORGE W. SMITH, JR., OF CLEVELAND, OHIO, ASSIGNOR TO THE WHITE MOTOR COMPANY, OF CLEVELAND, OHIO, A CORPORATION OF OHIO

METHOD OF BRAZING A PART OF NONFERROUS METAL IN A PART OF FERROUS METAL

Application filed June 12, 1931. Serial No. 543,775.

This invention relates to a method of brazing a small part of non-ferrous metal within a large part of ferrous metal, and is particularly concerned with the securement of valve seat inserts in an internal combustion engine.

The principal object of this invention is to provide a simple brazing method, as above defined, which will effect a strong and durable bond between the non-ferrous and the ferrous part.

Other objects will appear in the following description when read in connection with the drawings, in which.

Figure 1:
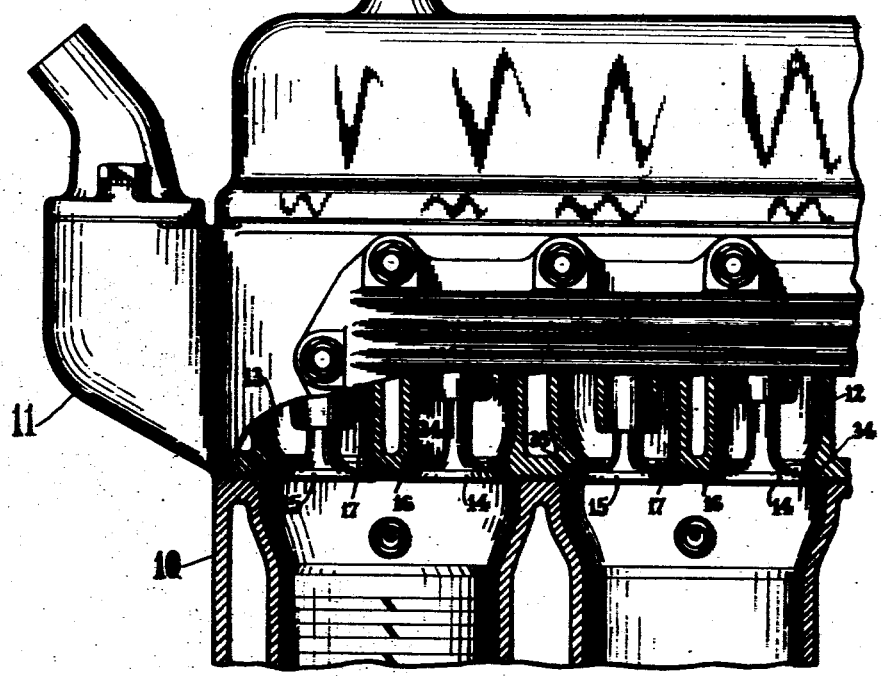
Figure 1 is a fragmentary side elevation, partly in section, of an engine equipped with valve seat inserts secured in place in accordance with this invention.
Figure 2:
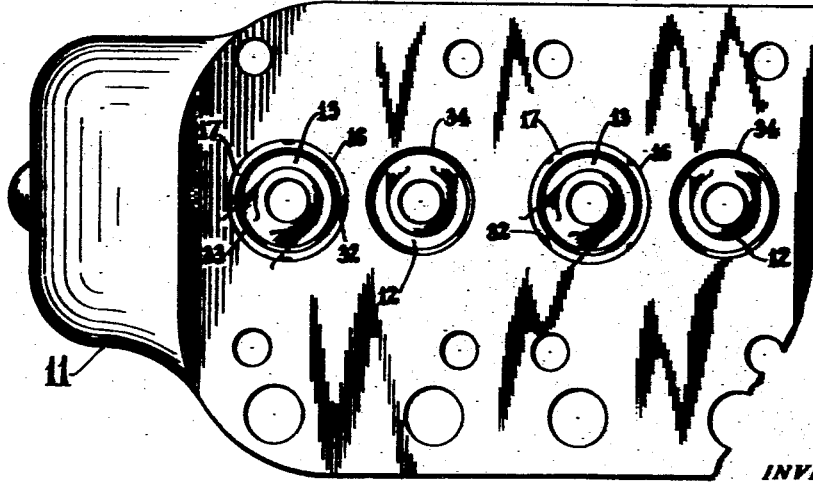
Figure 2 is a fragmentary bottom plan view of the cylinder head of the engine illustrated in Figure 1.

Figure 3 is a view illustrating a step in the brazing process employed in securing the valve seat inserts in the cylinder head, and consists of a sectional view of a container for retaining within the cylinder head the heat induced therein during the initial part of the brazing process, a side elevational view (partly in section) of the cylinder head, a fragmentary elevational view of a superadjacent torch, a sectional view of a protector member mounted in the left hand valve port opening of the cylinder head, a side elevational view of a second protector member mounted in the associated valve guide, and a side elevation of a spoon filled with flux.

Figure 4 is a view illustrating another step in the brazing process, and consists of a fragmentary sectional view of the cylinder block taken through the left hand valve port opening as viewed in Figure 3, a sectional view of the protector member for the valve port opening, a fragmentary side elevation of the torch first shown in Figure 3, and a side elevation of a piece of solder.

Figure 5 is a view illustrating another step in the brazing process, and consists of a sectional view of the cylinder block similar to that shown in Figure 4, a sectional view of the valve seat insert, a fragmentary side elevation of the torch shown in Figures 3 and 4, and a side elevation of a piece of solder.

Figure 6 is a fragmentary sectional view of the cylinder block showing an insert brazed in place.

Figure 7 is a perspective view of a valve seat insert.

Referring to the drawings, the engine therein illustrated consists in general of a conventional assembly of conventional parts including a cylinder block 10 and a cylinder head 11. The cylinder head 11 is constructed of cast iron, and is formed with inlet and exhaust passages 12 and 13 controlled by inlet and exhaust valves 14 and 15 respectively. The cast iron cylinder head is also formed with recessed seats 16 surrounding the interior ends of the exhaust passages 13. Brazed within the seats 16 are valve seat inserts 17 constructed of an aluminum bronze alloy which has been found particularly well adapted to withstand the hammering and grinding action of poppet valves at high temperatures.

In carrying out the process of brazing the inserts 17 within their seats 16 in the cylinder head by the specific procedure which I have adopted, the cylinder head is first preheated to a sufficiently high temperature to prevent rupture of the same by the spot-heating employed in later operations, but not above the scaling temperature of such part. This preheating of the cylinder head is accomplished in a furnace of the two-chamber type wherein the head is both heated uniformly, and protected from the corrosive action of flames or like agents.

Following the preheating of the cylinder head, it is placed within a heat retaining container 18 consisting of a metal base plate 19, a box like structure constructed of fire brick 20, and an asbestos cover 21. (See Figure 3.) Slidably and adjustably mounted above the container 18 upon a support (not shown), there is a gas torch 22 which is so arranged that its flame can be directed onto the seats 16 in the cylinder head through a slot 23 formed in the cover 21.

After the cylinder head has been placed within the container 18 and the cover 21 adjusted in place with the slot 23 overlying the seats 16 in the head, the slot is overlaid with asbestos sheets 24 except for a small part thereof overlying one of the seats 16. A metal protector ring 25 is then inserted into the uncovered seat 16, and a protector member 26 placed within the subjacent valve guide 27, after which the torch 22 is lighted and arranged so that its flame impinges upon the protector ring and the adjacent portion of the cylinder head. The flame is allowed to heat the protector ring 25, the seat 16, and the surrounding portion of the cylinder head to a temperature of about 1450 degrees Fahrenheit, a temperature slightly above the melting point of the solder employed in later operations, and then adjusted to maintain the protector ring and seat at such temperature. The walls of the seat 16 are then coated with a flux 28 of fused borax which is applied through apertures 29 in the protector ring 25 by means of a tool 30 after being reduced to a molten state by the heat of the flame, the protector ring being rotated during the operation so as to spread the flux over the entire surface of the walls of the seat.

Following the application of the borax flux to the walls of the seat 16, the walls of the seat are then coated with a hard solder consisting of 45 per cent silver, 25 per cent zinc, and 30 per cent copper. The solder is applied in the form of a slender bar 31 (see Figure 4), which is inserted into the different apertures 29 in the protector ring 25, and used as a means for rotating the protector ring to distribute over the surface of the walls of the seat the molten solder melted from its lower end.

After the walls of the seat 16 have been coated with solder, the protector ring 25 is removed and a valve seat insert 17 inserted. As soon as the insert 17 has obtained the temperature of the seat, the space between the insert and the walls of the seat is filled with hard solder of the same composition as that above described, the solder being melted from the ends of bars 31 inserted into notches 32 formed in the outer periphery of the insert, and the insert being rotated during the operation so as to insure that the entire space is filled.

After the space between the inserts 17 and the walls of the seat 16 have been filled with solder, the protector member 26 is removed from the valve guide 27, and the asbestos sheets 24 adjusted so as to cover that portion of the cylinder head then subjected to the heat of the flame and to uncover a second seat 16. The protector ring 25 is then inserted in the uncovered seat 16, and the protector member 26 placed within the subjacent valve guide 27, after which the torch is adjusted so that its flame impinges upon the protector ring 25 and the surrounding portion of the cylinder head. A second insert 17 is then brazed in place in the cylinder head, within the uncovered seat 16, by means of the same procedure as that employed in brazing the first insert in place. When inserts 17 have been brazed into all of the seats 16 in the cylinder head, the flame is extinguished and the head allowed to cool, following which the excess brazing material is removed and the seating surfaces 33 added.

The inlet valves 14 are provided with seats 34 formed in the cast iron cylinder head 11, but if desired may be provided with valve seat inserts similar to the inserts 17. Such construction is, however, not warranted in the present engine as the inlet valves and their seats are not subjected to sufficiently high temperatures as to materially lessen their resistance to wear, or to cause a material amount of scaling or pitting of such parts.

It is to be understood that my invention is not limited to the particular procedure described herein, or to the brazing materials employed in such procedure, but is broad enough to comprehend any procedure falling under the same general process, whether employing the same brazing materials, or materials capable of effecting a like result.

What I claim is:

1. The method of brazing a relatively small part of non-ferrous metal within a large part of ferrous metal, which consists in forming in said large part a seat for said small part slightly larger than said small part, preheating the entire large part to a temperature at which it will not rupture or crack when a portion thereof is heated to a temperature above the melting point of the solder to be used, heating the small part and the portion of the said large part to which said small part is to be affixed to a temperature above the melting point of the solder to be used, applying to the walls of the aforesaid seat by means of a melted flux a coating of melted hard solder, followed by the insertion of said small part within the aforesaid seat in said large part, and filling the space between said small part and the walls of the seat in said large part with melted solder of the same, or similar composition to the aforesaid solder.

2. The method of brazing a relatively small part of non-ferrous metal within a large part of ferrous metal, which consists in forming in said large part a seat for said small part slightly larger than said small part, preheating the entire large part to a temperature at which it will not rupture or crack when a portion thereof is heated to a temperature above the melting point of the solder to be used, said preheating being accomplished in such a manner that the portion of said large part to which said small part is to be attached is not subjected to a material amount of corrosion or oxidation, heating the portion of said large part to which said small part is to be attached to a temperature above the melting point of the solder to be used by means of a flame, the portion of said large part of which said small part is to be affixed being protected from the flame during said last named step by means of a shield, applying to the walls of the said seat in said large part with the shield in place within said seat a coating of melted hard solder through use of a melted flux, followed by the removal of the aforesaid shield and by the insertion of the said small part within the aforesaid seat in said large part, and filling the space between said small part and the walls of the seat in said large part with melted solder of the same or similar composition to the aforesaid solder.

3. The method of brazing a valve seat part of non-ferrous metal within a large part of an internal combustion engine constructed of ferrous metal, which consists in forming in said large part a seat for said valve seat part slightly larger than said valve seat part, preheating the entire large part to a temperature at which it will not rupture or crack when a portion thereof is heated to a temperature above the melting point of the solder to be used, said preheating being accomplished in a furnace in which said large part is both heated uniformly and protected from the corrosive action of flames or like agents, heating the portion of said large part to which said valve seat part is to be attached to a temperature above the melting point of the solder to be used by means of a flame, the portion of said large part to which said valve seat part is to be affixed being protected from the flame during said last named step by means of a metallic shield, applying to the walls of the said seat, through the use of a melted borax flux and with the metallic shield in place within said seat, a coating of melted solder consisting of substantially 45 per cent silver, 25 per cent zinc, and 30 per cent copper, followed by removal of the aforesaid shield and by the insertion of the aforesaid valve seat part within the said seat in said large part, and filling the space between said valve seat part and the walls of the seat in said large part with melted solder of the same composition as the aforesaid solder.

In testimony whereof I hereunto affix my signature this 10th day of June, 1931.

GEORGE W. SMITH, Jr.